June 3, 1930.    G. H. SHUTT    1,760,967
WARP STOP MOTION SEPARATOR
Filed Jan. 5, 1929
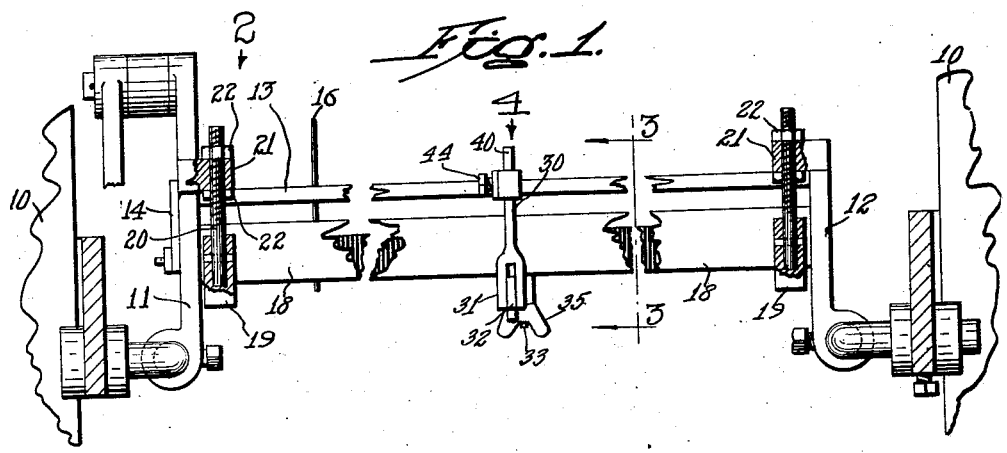
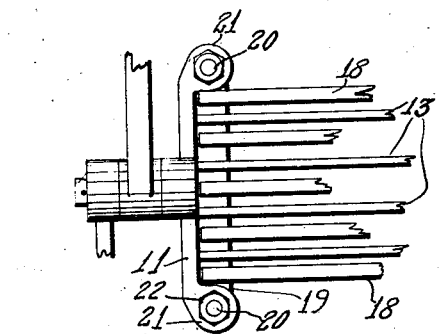
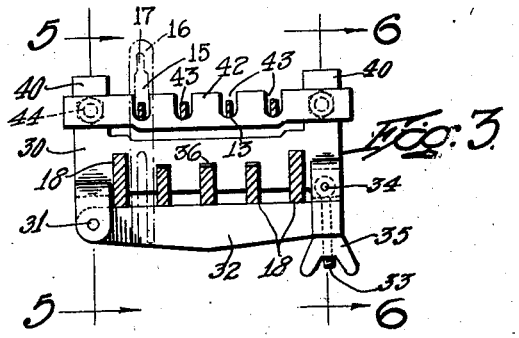
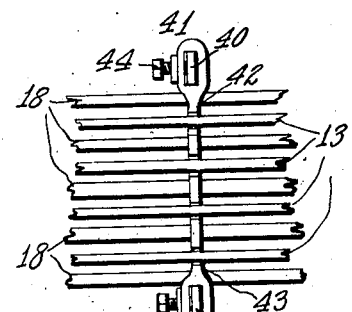
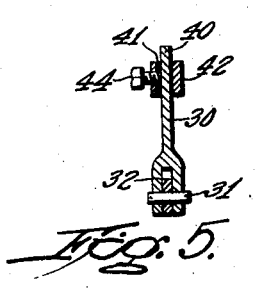
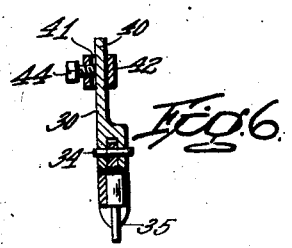
INVENTOR
GEORGE H. SHUTT
ATTORNEYS Patented June 3, 1930

1,760,967

UNITED STATES PATENT OFFICE

GEORGE H. SHUTT, OF NEW BEDFORD, MASSACHUSETTS, ASSIGNOR TO CROMPTON & KNOWLES LOOM WORKS, OF WORCESTER, MASSACHUSETTS, A CORPORATION OF MASSACHUSETTS

WARP-STOP-MOTION SEPARATOR

Original application filed May 25, 1927, Serial No. 194,178. Divided and this application filed January 5, 1929. Serial No. 330,651.

This application is a division of my prior application Ser. No. 194,178, filed May 25, 1927.

This invention relates to an improved form of separator for warp stop motions and it is the general object of the invention to provide a separator to be clamped on the separator bars of a warp stop motion, there being provision for guiding and accommodating oscillating detector rods which are movable relatively to the separator bars to assume a plurality of positions with respect to the latter.

In the aforesaid application I have shown a warp stop motion having oscillating detector rods movable about fixed axes to cooperate with drop wires having slots in their upper ends. The drop wires extend downwardly between separator bars which arrest angular movement of a fallen drop wire to effect loom stoppage when a fault occurs in the warp. It is desirable under certain conditions to be able to raise or lower the separator bars so that the distance between said bars and the oscillating detector rods may be varied. The necessity for such change may arise out of the fact that the number of harnesses employed in the loom may be either increased or diminished.

The detector rods are ordinarily suspended at their ends, being driven from one end and being supported for rotation at the other end. The rods must be sufficiently small to extend through the slots in the drop wires and where the loom is relatively wide it is desirable to employ a separator at an intermediate point along the width of the loom to prevent sagging of the detector rods. It is an important object of my present invention to provide a separator which may be changed as to proportions and form to accommodate the relative changes between the separator bars and the detector rods previously mentioned. It is to be understood that the separator derives its support from the heavier separator bars and is provided preferably with notches or similar conformations to receive the detector rods to support the latter while at the same time permitting free oscillation thereof.

With these and other objects in view which will appear as the description proceeds, my invention resides in the combination and arrangement of parts hereinafter described and set forth in the claims.

In the accompanying drawings, wherein a convenient embodiment of my invention is set forth, Fig. 1 is a rear elevation of a warp stop motion of a type to which my invention may apply, certain parts being in section, Fig. 2 is a top plan view taken in the direction of arrow 2, Fig. 1, Fig. 3 is a detailed vertical section taken on line 3—3 of Fig. 1 looking in the direction of the arrows, Fig. 4 is a top plan view taken in the direction of arrow 4, Fig. 1, and Figs. 5 and 6 are detailed vertical sections taken on the lines 5—5 and 6—6, respectively, of Fig. 3.

Referring to Fig. 1 I have shown a loom frame 10 to which is secured in any approved manner a head frame 11 and a tail frame 12. Said head frame supports a plurality of relatively small detector rods 13 which oscillate about their axes by means of arms one of which is indicated at 14. Each rod is given a periodic oscillation and normally extends through the lower ends of a slot 15 formed in the drop wires 16 of the corresponding bank. The upper end of the slot 15 is restricted as at 17 to engage the corresponding detector rod at the time of warp fault.

Relatively heavy separator bars 18 the outer of which are relatively high and the intermediate ones of which are relatively low are supported at each end by a carrier 19. There is one carrier at the head end and also another at the tail end of the motion, and each carrier has extending upwardly therefrom a pair of threaded rods 20 the lower ends of which are fastened to the carrier 19 and the upper ends of which extend through a boss 21. It is to be understood that each of the frames 11 and 12 is provided with a boss 21. By means of nuts 22 which are threaded on the rod 20 both above and below the boss 21 the carrier 19 may be raised or lowered with respect to the detector rods 13.

The matter thus far described forms no part of my present invention, the type of motion being generally that shown in Patent No. 1,265,112. The manner of raising and lowering the separator bars is the same as shown in the aforesaid application. It is sufficient for the purposes of my present invention to state that the rods 13 oscillate about their fixed axes at periodic intervals and that the separator bars 18 may be raised or lowered to assume a plurality of different positions with respect to the detector rods.

The separator which supports the intermediate portions of the relatively light detector rods 13 has a body portion 30 to the lower end of which is pivoted as at 31 a bottom cap 32. Said cap may have extending therethrough a screw 33 hinged as at 34 to the body portion 30. A winged nut 35 may be employed to facilitate slackening of the hinged cap 32. The body 30 is provided with a plurality of slots 36 on its under side to accommodate the separator bars 18, the slots being of proper height so as to receive the high and low separator bars. These portions of the separator are substantially the same as the corresponding parts shown in prior patent to Regan No. 1,496,377.

My invention relates more particularly to the means for supporting the detector rods, and in carrying my invention into effect I provide the body portion with a pair of spaced upstanding horns 40 which extend through openings 41 located one at each end of a rod support 42. Said support is provided with upwardly opening notches 43 through which extend the detector rods 13. In order to vary the position of the rod support with respect to the separator bars I provide each end of said rod support 42 with a screw 44 which is threaded through a portion of the support 42 to have holding engagement with the corresponding horn 40.

The horns are sufficiently high to permit the rod support 42 to occupy any position which may be required due to the changed conditions in the loom.

In operation when it is desired to effect an adjustment between the separator bars and the detector rods 13 the screws 44 may be released and the rod support 42 moved either up or down as the case may be along the horns 40. When said support 42 is in its correct position the screws 44 may be tightened. It is to be understood that the separator shown particularly in Fig. 3 derives its entire support from the separator bars and that the support 42 acts to prevent undue sagging of the detector rods 13. The notches 43 are made sufficiently large to permit free and uninterrupted oscillation of the rods 13 about their axes.

From the foregoing it will be seen that I have provided a separator for a warp stop motion wherein the detector rod supporting element is capable of assuming a plurality of positions at different distances from the separator bars. It will also be seen that the detector rod support derives its support from the separator bars.

Having thus described my invention it will be apparent that changes and modifications may be made therein by those skilled in the art without departing from the spirit and scope of the invention and I do not wish to be limited to the details herein disclosed, but what I claim is:

1. A warp stop motion separator for separator bars and oscillating detector rods, said separator including a body portion having provision for attachment to the separator bars, and a detector rod support movable relatively to the body portion, to be supported thereby, and supporting connections between the body portions and the rod supports to hold the latter securely in any one of a plurality of positions at different distances from the separator bars.

2. A warp stop motion separator for warp stop motions having separator bars and oscillating detector rods, said separator having a body member to be secured to the separator bars and having also a support member for the detector rods movable vertically on the body member in a direction toward and from the part of the body member adapted for engagement of the separator bars, and one member having vertical projections to be secured to the other member to secure said support member to the body member in any one of a plurality of different positions.

3. A separator for warp stop motions having separator bars and oscillating detector rods, said separator having a body portion and having also a bottom cap movable with respect to the body portion and held to the latter in clamping relation with respect to the separator bars, vertically extending horns on said body portion, and a detecting rod support for the detector rods mounted on said horns and secured thereto in any one of a plurality of positions at different distances from the bottom cap.

In testimony whereof I have hereunto affixed my signature.

GEORGE H. SHUTT.